United States Patent
Liu et al.

(10) Patent No.: US 7,257,078 B2
(45) Date of Patent: Aug. 14, 2007

(54) MULTIPLE ANTENNA OFDM TRANSCEIVER AND METHOD FOR TRANSCEIVING

(75) Inventors: Der-Zheng Liu, Tai-Nan (TW); Shan-An Yang, Chang-Hua Hsien (TW); Kuang-Yu Yen, Tai-Chung (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 897 days.

(21) Appl. No.: 10/249,557

(22) Filed: Apr. 17, 2003

(65) Prior Publication Data

US 2004/0208115 A1    Oct. 21, 2004

(51) Int. Cl.
*H04J 11/00* (2006.01)
*H04B 7/216* (2006.01)

(52) U.S. Cl. .................. 370/208; 370/342; 370/343

(58) Field of Classification Search ............ 370/203, 370/260, 285, 204, 208, 329, 206, 207; 455/501, 455/502, 525, 136, 138; 375/340, 347, 316, 375/349, 350, 146, 147
See application file for complete search history.

(56) References Cited

U.S. PATENT DOCUMENTS

| | | | |
|---|---|---|---|
| 5,457,811 A | 10/1995 | Lemson | |
| 5,831,456 A | 11/1998 | Sutardja | |
| 6,097,755 A | 8/2000 | Guenther, Jr. et al. | |
| 6,141,393 A * | 10/2000 | Thomas et al. | 375/347 |
| 6,327,314 B1 | 12/2001 | Cimini, Jr. | 375/340 |
| 6,442,129 B1 | 8/2002 | Yonge, III | 370/204 |
| 6,473,393 B1 | 10/2002 | Ariyavisitakul | 370/203 |
| 6,480,528 B1 | 11/2002 | Patel et al. | |
| 6,862,440 B2 * | 3/2005 | Sampath | 455/276.1 |
| 6,996,195 B2 * | 2/2006 | Kadous | 375/341 |
| 2002/0181549 A1 * | 12/2002 | Linnartz et al. | 375/142 |
| 2003/0045250 A1 | 3/2003 | Hampoia | |
| 2003/0112882 A1 * | 6/2003 | Sampath | 375/260 |
| 2004/0005010 A1 * | 1/2004 | He et al. | 375/260 |
| 2004/0120422 A1 | 6/2004 | Lin et al. | |
| 2004/0146091 A1 | 7/2004 | Chang et al. | |
| 2004/0204098 A1 | 10/2004 | Owen | |

* cited by examiner

*Primary Examiner*—Chau Nguyen
*Assistant Examiner*—Hicham B Foud
(74) *Attorney, Agent, or Firm*—Winston Hsu

(57) ABSTRACT

An RF receiver includes a plurality of OFDM modules. The OFDM modules include receiver antennas for substantially simultaneously receiving a plurality of transmission signals transmitted via a single frequency band having a plurality of sub-channels. Further included is a channel estimation module connected to the plurality of OFDM modules, and a channel compensation module connected to the channel estimation module and the plurality of OFDM modules. For each sub-channel, the channel estimation module is capable of estimating channel frequency responses affecting the transmission signals, and the channel compensation module is capable of compensating the transmission signals according to the estimated channel frequency responses. The receiver allows an improved transfer rate per frequency band.

18 Claims, 8 Drawing Sheets

MULTIPLE ANTENNA OFDM TRANSCEIVER AND METHOD FOR TRANSCEIVING

BACKGROUND OF INVENTION

1. Field of the Invention

The present invention relates to a wireless communication system, and more specifically, to an OFDM system for wireless communication in a wireless local area network.

2. Description of the Prior Art

Wireless local area networks (WLANs) are ever increasingly being used in network environments where mobility is of importance. Orthogonal frequency division multiplexing (OFDM) is a well-known concept used in implementing WLAN hardware. A typical WLAN employing OFDM can achieve a maximum data transfer rate of 54 Mbps per client, which is significantly less than the wire-based LAN capability of between 100 Mbps to 10 Gbps. This 54 Mbps transfer limit for WLANs is a consequence of current technological limitations and regulation, such as that according to IEEE 802.11a or 802.11g for example. For conventional WLANs, the advantage of mobility can be enhanced by an improvement in data rate.

FIG. 1 illustrates a convention WLAN 10 including an access point 12, a first user terminal 14, and a second user terminal 16. The WLAN 10 is very much typical of an IEEE 802.11a or 802.11g implementation. The access point 12 includes four antennas (or antenna pairs) for communicating data with the terminals 14, 16, the first user terminal 14 having a single antenna and the second user terminal 16 having two antennas. In the access point 12, a single antenna is used to communicate with the first user terminal 14, and two antennas are used to communicate with the second user terminal 16 over three frequency bands in total.

FIG. 2 illustrates the frequency band assignment of the WLAN 10 of FIG. 1. As each antenna operates in a distinct frequency band, the first user terminal 14 uses a first frequency band, while the second user terminal 16 uses second and third frequency bands. Thus, in accordance with the above-mentioned 54 Mbps transfer rate limitation, the first user terminal 14 and second user terminal 16 have maximum data rates of 54 Mbps and 108 Mbps respectively. Increasing these data rates can only be facilitated by increasing the number of antennas in the user terminals 14, 16 and consequently increasing the number of available frequency bands. In addition, if the WLAN 10 has only three frequency bands available for use, the access point 12 is encumbered with an extra antenna that cannot be used to communicate with another user terminal.

Frequency band assignments for WLANs are set forth in IEEE standards 802.11a and 802.11g, for example. According to IEEE Std 802.11a-1999, the 5 Ghz band comprises 12 frequency bands for data communication. Similarly, the 2.4 Ghz band of IEEE 802.11g offers three frequency bands. Following these specifications, prior art implementations have been constrained to one band per antenna and the resulting 54 Mbps maximum data rate per band.

Therein lies the main problem with the prior art regarding transfer rate. Specifically, in order to increase the data rate to a given terminal, more antennas and thus more frequency bands (available frequency bands being limited in number) must be employed. This runs counter to the need to free up frequency bands for communication with a larger number of terminals. In short, the prior art suffers from limitations in data rate per frequency band.

SUMMARY OF INVENTION

It is therefore a primary objective of the claimed invention to provide an OFDM receiver having multiple antennas and corresponding data paths for a given frequency band, accordingly offering an increased data transmission rate for the frequency band.

Briefly summarized, the claimed invention includes a plurality of OFDM modules. The OFDM modules include receiver antennas for substantially simultaneously receiving a plurality of transmission signals transmitted via a single frequency band having a plurality of sub-channels. Further provided is a channel estimation module connected to the plurality of OFDM modules, and a channel compensation module connected to the channel estimation module and the plurality of OFDM modules. For each sub-channel, the channel estimation module is capable of estimating channel frequency responses affecting the transmission signals, and the channel compensation module is capable of compensating the transmission signals according to the estimated channel frequency responses.

According to the claimed invention, a method includes first substantially simultaneously receiving a plurality of transmission signals via a plurality of sub-channels over a single frequency band, then, estimating channel frequency responses affecting the received signals, before finally, compensating the received signals with the estimated channel frequency responses.

It is an advantage of the claimed invention that each antenna can receive distinct data over the same frequency band.

It is a further advantage of the claimed invention that an overall data transfer rate is limited by a number of antennas rather than by a number of frequency bands.

These and other objectives of the claimed invention will no doubt become obvious to those of ordinary skill in the art after reading the following detailed description of the preferred embodiment that is illustrated in the various figures and drawings.

DETAILED DESCRIPTION

Figure 3:
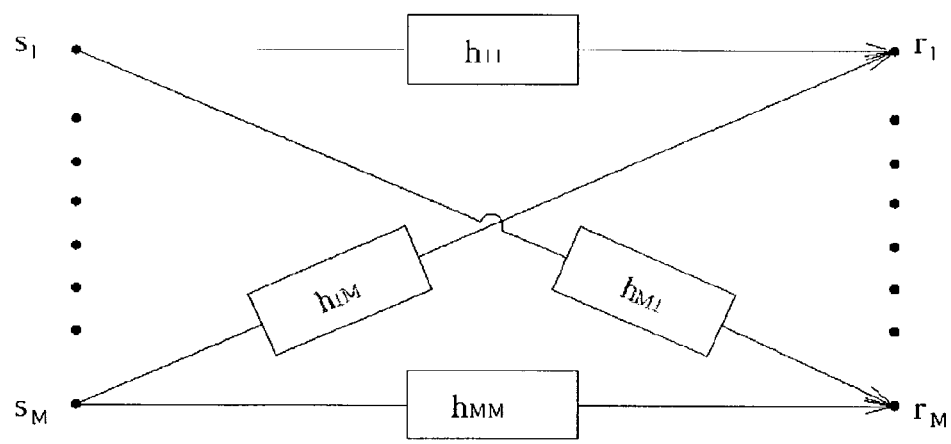
FIG. 3 is a schematic diagram of signal transmission between multiple transmitter and receiver antennas.

Please refer to FIG. 3, which is a schematic diagram illustrating signal transmission and reception in a multiple transmitter/receiver antenna application. When a group of signals $s_1$-$s_M$ is transmitted along the pathways, $h_{11}$ etc, shown, they are substantially simultaneously received as signals $r_1$-$r_M$ after undergoing inter-antenna interference.

Generally, for M transmitters and receivers, such transmission and interference can be described by the channel impulse response matrix as follows:

$$h = \begin{bmatrix} h_{11} & h_{12} & \cdots & h_{1M} \\ h_{21} & h_{22} & \cdots & h_{2M} \\ \vdots & \vdots & \ddots & \vdots \\ h_{M1} & h_{M2} & \cdots & h_{MM} \end{bmatrix}, \quad (1)$$

where h is a channel impulse response, and

M is a total number of channel or transmitter-receiver combinations.

The digits of the index of each channel impulse response value, h, respectively indicate the receiver and transmitter antennas defining such channel. For example, the channel impulse response value $h_{12}$ corresponds to a first receiver antenna and a second transmitter antenna. The channel impulse response matrix (1) relates transmitted and received signals as follows:

$$r = h \cdot s + n, \quad (2)$$

where r is a vector comprising the received signals $[r_1\ r_2\ \ldots\ r_M]^T$, s is a vector comprising the transmitted signals $[s_1\ s_2\ \ldots\ s_M]^T$, and n is a vector comprising noise affecting each receiver $[n_1\ n_2\ \ldots\ n_M]^T$, which can be neglected.

The matrix (1) and relation (2) apply to orthogonal frequency division multiplexing (OFDM) wireless local area network (WLAN) hardware. In the following description, the present invention provides a receiver and a method that effectively estimate the channel impulse response matrix (1) by way of an example of an OFDM WLAN receiver according to the IEEE 802.11a or 802.11g standards. It should be noted that in this description and in the figures, capital letter notation refers to the frequency domain, while lower case letter notation refers to the time domain, as is well know in the art.

Figure 4:
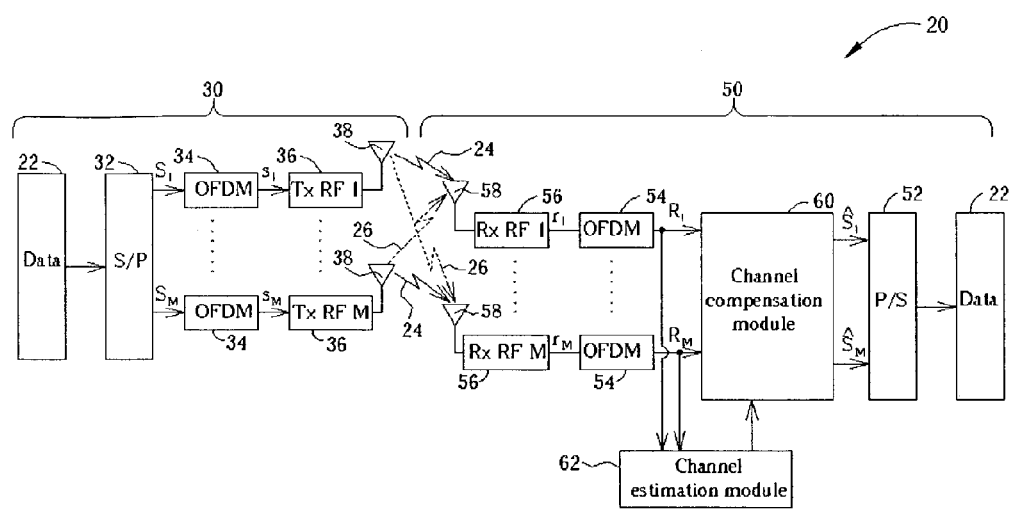
FIG. 4 is a block diagram of a communication system according to the present invention.

Referring to FIG. 4, a communication system 20 according to the present invention is illustrated. The communication system 20 comprises a transmitter 30 and a receiver 50 capable of operating on a single frequency band. The transmitter 30 accepts data 22 for transmission at a serial to parallel interface 32. The serial to parallel interface 32 is connected to a plurality of OFDM modules each comprising an OFDM transmitter 34, transmitter RF hardware 36, and a transmitter antenna 38 adapted to transmit RF signals. The transmitter 30 is capable of processing the data 22 and transmitting corresponding signals by each antenna 38 to the receiver 50, as shown in FIG. 4 by lines indicating intended RF data transmissions 24 and inter-antenna interference 26. The receiver 50 includes a plurality of OFDM modules each comprising a receiver antenna 58, receiver RF hardware 56, and an OFDM receiver 54. The OFDM receivers 54 are adapted to output signals to a connected channel compensation module 60 and channel estimation module 62. The channel compensation module 60 is connected to a parallel to serial interface 52 that outputs the transmission data 22. The channel compensation and estimation module 60, 62 work in conjunction to eliminate the effects of inter-antenna interference 26 such that the data 22 can be accurately received at the receiver 50.

As established by the OFDM receivers 54, the channel compensation and estimation modules 60, 62 operate in a frequency domain. In the frequency domain portions of the communication system 20, matrix (1) becomes a channel frequency response matrix as follows:

$$H_k = \begin{bmatrix} H_{11,k} & H_{12,k} & \cdots & H_{1M,k} \\ H_{21,k} & H_{22,k} & \cdots & H_{2M,k} \\ \vdots & \vdots & \ddots & \vdots \\ H_{M1,k} & H_{M2,k} & \cdots & H_{MM,k} \end{bmatrix}, \quad (3)$$

where the digits of the first index of each channel frequency response value H respectively indicate the receiver and transmitter antennas 56, 36 defining such channel, M being the total number of channels defined. For example, the channel frequency response value $H_{12}$ corresponds to a first receiver antenna 56 and a second transmitter antenna 36. The channel frequency response matrix (3) relates transmitted and received signals as follows:

$$R_{n,k} = H_k \cdot S_{n,k} + N_{n,k}, \quad (4)$$

where

R is a vector comprising the received signals $[R_{1,n,k}\ R_{2,n,k}\ \ldots\ R_{M,n,k}]^T$, S is a vector comprising the transmitted signals $[S_{1,n,k}\ S_{2,n,k}\ \ldots\ S_{M,n,k}]^T$, N is a vector comprising noise affecting each channel $[N_{1,n,k}\ N_{2,n,k}\ \ldots\ N_{M,n,k}]^T$, and can be neglected, n is an index of an OFDM symbol, and k is an index of a sub-channel Regarding equation (4), OFDM symbols are received over time by the OFDM receivers 54 of the receiver 50 and are accordingly indexed as n. That is, each OFDM symbol is assigned an index n based on its relative position in time. Moreover, although the receiver 50 operates in a single frequency band, the OFDM receivers 54 allow for multiple sub-channels as indexed by k. The transmitter 30 and receiver 50 of FIG. 4 are bound by the equation (4), with the channel estimation module 62 estimating the channel frequency response matrix (3) and the channel compensation module 60 applying the estimated channel frequency response to facilitate exact communication of the data 22.

The channel estimation module 62 generates an estimate of the channel frequency response matrix (3) by performing a calibration comparing known original transmission signals with signals received at the receiver 50. That is, known calibration signals are transmitted separately or as part of a data transmission, with the received versions of these calibration signals being compared to the originals to determine what compensation must be applied to the data signals. For each sub-channel, k, an inversable calibration matrix is defined as follows:

$$P_k = \begin{bmatrix} P_{1,1,k} & P_{1,2,k} & \cdots & P_{1,M,k} \\ P_{2,1,k} & P_{2,2,k} & \cdots & P_{2,M,k} \\ \vdots & \vdots & \ddots & \vdots \\ P_{M,1,k} & P_{M,2,k} & \cdots & P_{M,M,k} \end{bmatrix}, \quad (5)$$

referencing a long preamble symbol $L_k$, such as that defined in the IEEE 802.11a or 802.11g standards, and an inversable linear combination matrix such as:

$$c = \begin{bmatrix} 1 & 0 & \cdots & 0 \\ 0 & 1 & \cdots & 0 \\ \vdots & \vdots & \ddots & \vdots \\ 0 & 0 & \cdots & 1 \end{bmatrix}, \text{ where } c^{-1} = c, \quad (6)$$

$$c = \begin{bmatrix} 1 & 1 & \cdots & 1 \\ 1 & \omega & \cdots & \omega^{M-1} \\ \vdots & \vdots & \ddots & \vdots \\ 1 & \omega^{M-1} & \cdots & \omega^{(M-1)^2} \end{bmatrix}, \text{ where} \quad (7)$$

$$c^{-1} = \frac{1}{M}\begin{bmatrix} 1 & 1 & \cdots & 1 \\ 1 & \omega^{-1} & \cdots & \omega^{-(M-1)} \\ \vdots & \vdots & \ddots & \vdots \\ 1 & \omega^{-(M-1)} & \cdots & \omega^{-(M-1)^2} \end{bmatrix}$$

and $\omega$ is the root of $1 + \omega + \ldots + \omega^{M-1} = 0$, or $$c = C_M = \begin{bmatrix} C_{M/2} & C_{M/2} \\ C_{M/2} & -C_{M/2} \end{bmatrix}, \text{ where } c^{-1} = \frac{1}{M}C_M, \quad (8)$$

$C_1 = 1$, and $M$ is multiple of 2.

The calibration matrix (5) is related to the long preamble symbol and an inversable linear combination matrix (6), (7), or (8), for example, by:

$$P_k = L_k \cdot c \quad (9)$$

where $L_k$ is the long preamble symbol.

Note that the indices of the calibration matrix (5) receiver antenna number, OFDM symbol number n, and sub-channel k. Any calibration data can be used provided that it forms an inversable matrix, the above inversable linear combination matrices (6), (7), or (8) being given as examples. Furthermore, it is advantageous to select the calibration data such that the calibration matrix (5) has fewer unique elements than transmitter-receiver antenna combinations, M, so as to reduce hardware complexity and cost.

The channel estimation module 62 calculates the estimate of the channel frequency response according to the following:

$$\hat{H}_k = \Psi_k \cdot P_k^{-1}, \quad (10)$$

where $\hat{H}_k$ is an estimate of the channel frequency response matrix H (3) for a sub-channel k, and $\Psi_k$ is the calibration data $P_k$ as received at the receiver 50 affected by inter-antenna interference.

From equation (10) it can be seen that if there is no inter-antenna interference 26 in the communication system 20, the transmitted calibration data $\Psi_k$ is equal to the reference calibration data is equal to the reference calibration data $P_k$, and the estimate of the channel frequency response matrix $\hat{H}_k$ becomes the identity matrix. In this special case, equation (4) illustrates that the received signals are exactly the transmitted signals (neglecting noise). In a practical case, where inter-antenna interference 26 exists, the channel estimation module 62 provides a suitable estimate of the frequency responses according to the aforementioned calibration and equation (10).

Once the channel estimation module 62 determines a suitable estimate for the channel frequency response according to equation (10), the channel compensation module 60 effects the estimate such that:

$$\hat{S}_{n,k} = \hat{H}_k^{-1} \cdot R_{n,k}, \quad (11)$$

where $\hat{S}_k$ is a vector comprising an estimate of the originally transmitted signals, and ideally equal to S of equation (4).

Figure 5:
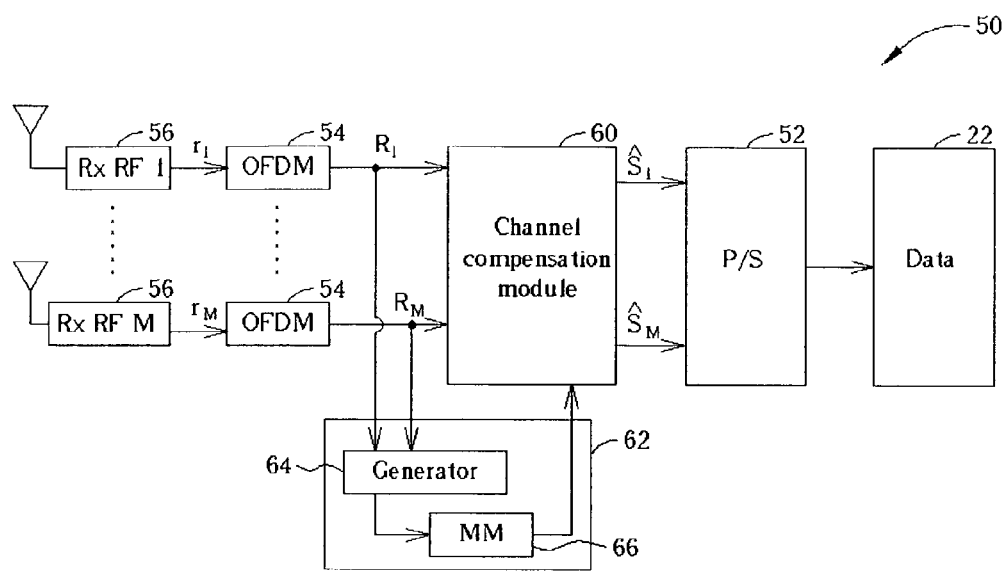
FIG. 5 is a block diagram of the receiver of FIG. 4.

Referencing FIG. 4 and FIG. 5 and equations (5) through (10), operation of the present invention communication system 20 will now we described in detail. The data 22 to be transmitted is configured such that a portion of it comprises predetermined calibration data as the inversable calibration matrix $P_k$ (5), (9). This can be arranged in several ways, which will be discussed further. The transmitter 30 configures the data 22 as OFDM signals and then transmits these signals 24 via antennas 38 over a single frequency band. Each receiver antenna 58 receives the transmitted signals, which have been affected by inter-antenna interference 26, and forwards them to the channel estimation module 62. The channel estimation module 62 extracts the received calibration data $\Psi_k$ and compares it with the original calibration data $P_k$. In a preferred embodiment of the receiver 50 as shown in FIG. 5, a generator 64 of the estimation module 62 extracts the received calibration data $\Psi_k$ and a matrix multiplier 66 multiplies the received calibration data $\Psi_k$ with the inversed original calibration matrix $P_k$ to determine the estimation of the channel frequency response matrix $\hat{H}_k$ equation (10). If required by specific applications, the channel estimation module 62 can include further matrix manipulation elements such as a matrix inverter. Finally, the estimation module 62 forwards the estimated channel frequency response matrix $\hat{H}_k$ to the channel compensation module 60, which applies the estimate to the received signals $R_k$ to output the estimate of the transmitted signals $\hat{S}_k$ as in equation (11).

Note that either the channel estimation module 62 or the channel compensation module 60 inverses the channel frequency response matrix $\hat{H}_k$. In practical application under correct operating conditions, the estimated signals $\hat{S}_k$ will be equivalent to the originally transmitted signals $S_k$.

In an alternative embodiment, an inverse of the channel frequency response matrix is applied such that equations (10) and (11) become:

$$\hat{Q}_k = \Psi_k^{-1} P_k, \quad (10')$$

$$\hat{S}_{n,k} = \hat{Q}_k \cdot R_{n,k}, \quad (11')$$

where $\hat{Q}_k$ is the inverse of the estimated channel frequency response matrix $\hat{H}_k$ (3)

In this alternative embodiment, inversion of the estimated channel frequency response matrix (3) is not required as in equation (11), however, the received calibration data matrix $\Psi_k$ must be inverted instead. This alternative embodiment has advantages in specific implementations of the present invention.

Figure 6:
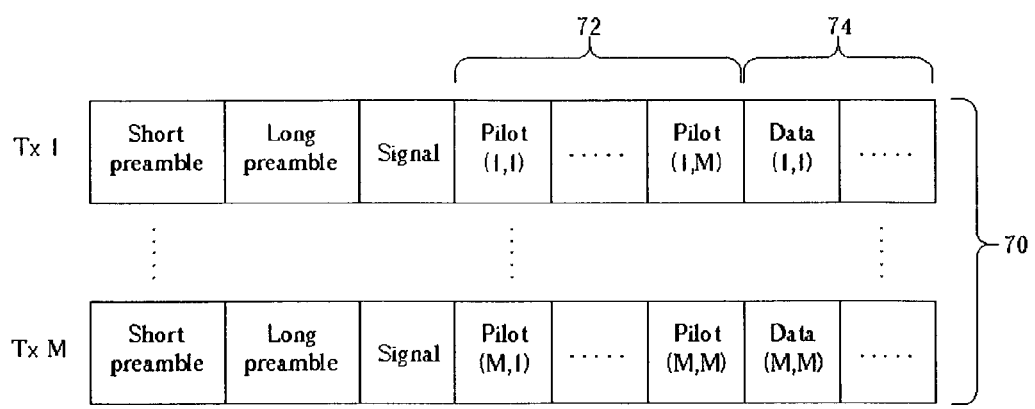
FIG. 6 is a block diagram of signals transmitted in the communication system of FIG. 4.

Referring to FIG. 6, signals 70 of the communication system 20 according to an IEEE 802.11a or 802.11g format are illustrated. Pilot segments 72 of these signals 70 are used to carry the calibration data of the matrix (5), and data segments 47 are arranged after the pilot segments 72 for transmitting user data. The compositions of the pilot segments 72 and the data segments 74 are varied according to the associated transmitter. Such a signal configuration serves as an example, and naturally, others are suitable as well.

Figure 1:
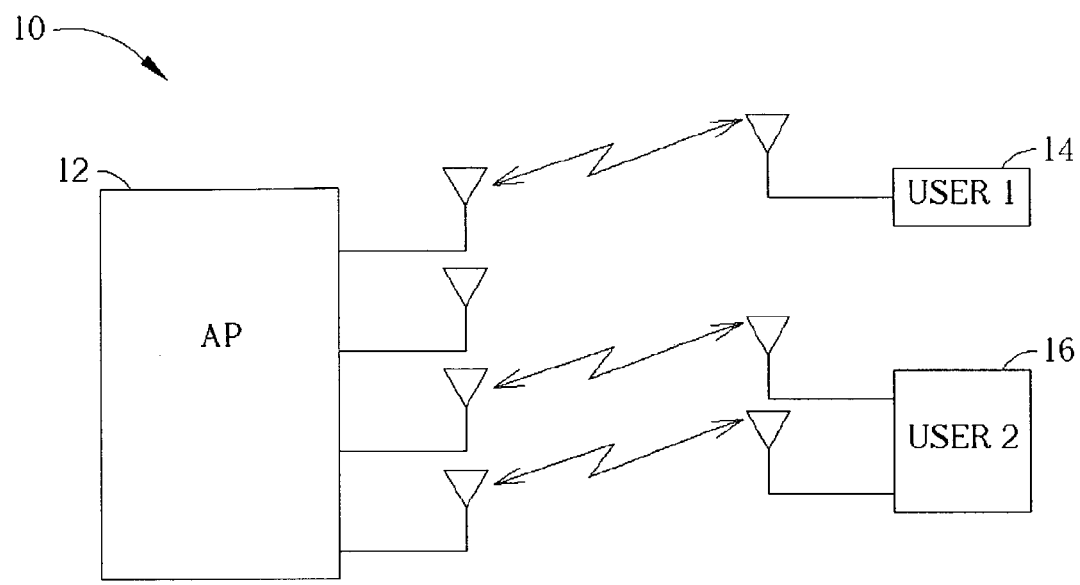
FIG. 1 is a block diagram of a prior art WLAN.
Figure 2:
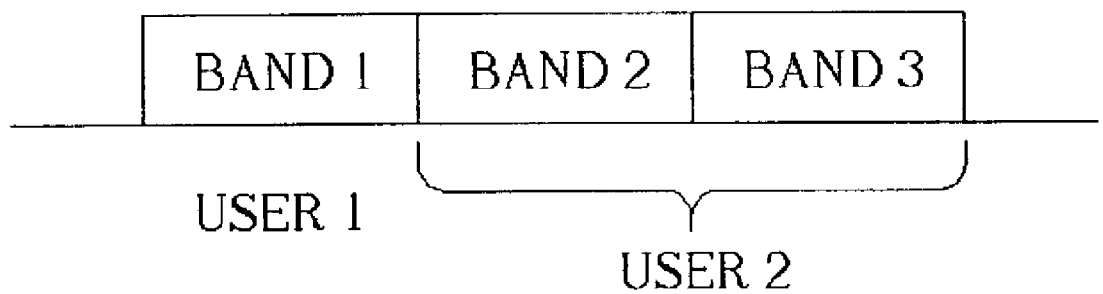
FIG. 2 is a schematic diagram of frequency band use in the WLAN of FIG. 1.
Figure 7:
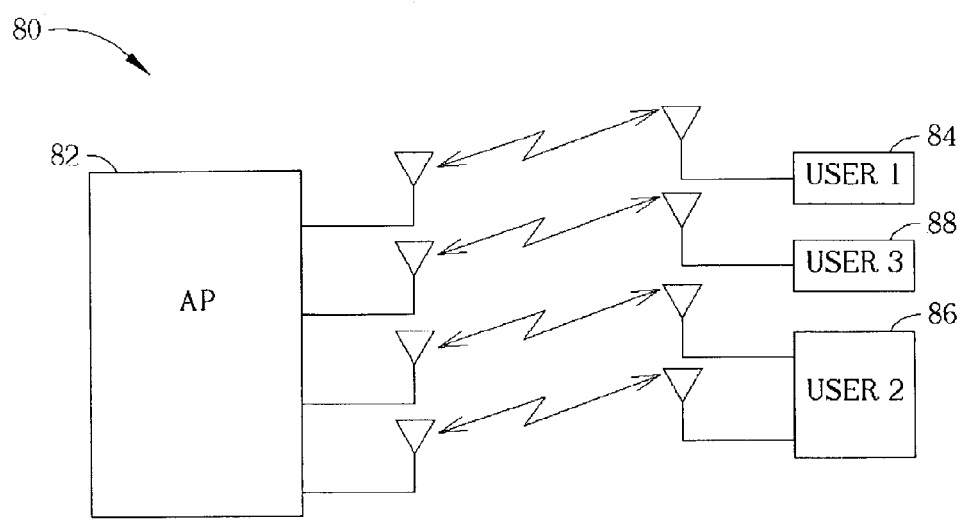
FIG. 7 is a block diagram of a WLAN according to the present invention.
Figure 8:
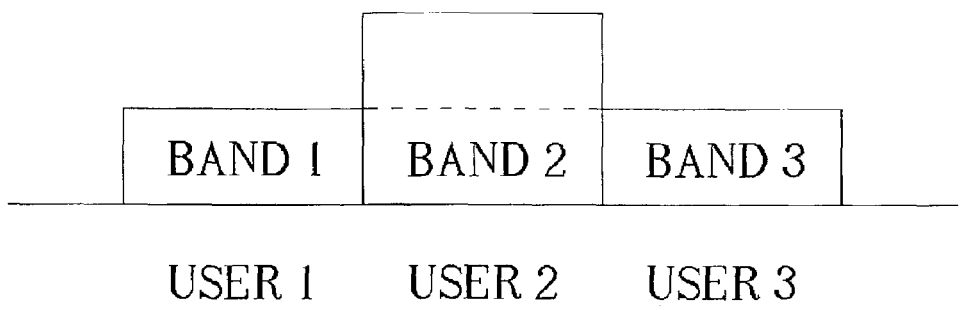
FIG. 8 is a schematic diagram of frequency band use in the WLAN of FIG. 7.

The present invention communication system 20 can be readily incorporated into a WLAN 80 as shown in FIG. 7. The WLAN 80 includes an access point 82 having four antennas and related transmitter and receiver hardware (see FIG. 4), and first, second, and third user terminals 84, 86, 88 each having corresponding transmitter and receiver hardware. However, in contrast to the conventional WLAN 10 of FIG. 1, a limited number of frequency bands (three, in FIG. 8) does not result in a corresponding limit in data transfer rate. The second user terminal 86 communicates with the access point 82, through a system such as that of FIG. 4 having two transmitter and receiver antennas using a single frequency band. That is, two antennas of the access point 82 and the corresponding two antennas of the second user terminal 86 are able to share the same frequency band as the access point 82 and second user terminal 86 employ the channel compensation module 60 and channel estimation module 62 of the present invention. By sharing a single frequency band, another frequency band becomes available for the third user terminal 88. FIG. 8 illustrates the frequency band assignments of the present invention WLAN 80. The second user terminal 86 effectively achieves the same data rate as if it were utilizing two separate frequency bands (as in prior art FIG. 2).

Generally, increasing the number of antennas for each frequency band increases the total available data transfer rate. The present invention is not limited by the number of frequency bands available, and if higher transfer rates are required, more antennas are used. An access point according to the present invention can employ any number of antennas and supporting hardware for switching the active frequency bands of the antennas so as to communicate in a flexible way with clients having numerous and varied antenna configurations. For example, an access point having eight antennas could communicate with two clients, each having four antennas, using only two frequency bands. The resulting data transfer rate for each client would be equivalent to that when using four distinct frequency bands per client. In a changing WLAN environment, the same access point could support one to eight clients, the transfer rate of each client being limited primarily its number of antennas. Of course, if necessary, an access point implementing the present invention could also assign more that one frequency band to a given client as in the prior art. The present invention, thus, eliminates the data transfer bottleneck caused by a limited number of frequency bands.

In contrast to the prior art, the present invention receiver includes multiple OFDM modules for receiving data on a single frequency band. A channel estimation module and channel compensation module are provided for respectively estimating and effecting channel frequency responses. Thus, an overall data transfer rate of the receiver is limited by a number of antennas rather than by a number of available frequency bands as in the prior art.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A receiver for receiving a plurality of transmission signals, the receiver comprising:
    a plurality of orthogonal frequency division multiplexing (OFDM) modules having a plurality of receiver antennas for substantially simultaneously receiving a plurality of received transmission signals via a single frequency band having a plurality of sub-channels;
    a channel estimation module coupled to the OFDM modules for estimating a plurality of channel frequency responses affecting the transmission signals for each of the sub-channel, wherein the channel estimation module comprises:
        a generator for representing the received calibration data of the received transmission signals as a first matrix for each sub-channel of the frequency band; and
        a matrix multiplication element for multiplying the first matrix by an inverse of a second matrix comprising the calibration data of the transmission signals to generate the estimated channel frequency responses for each sub-channel; and
    a channel compensation module coupled to the channel estimation module and the OFDM modules for compensating the received transmission signals according to the estimated channel frequency responses for each of the sub-channel.

2. The receiver of claim 1, wherein each of the transmission signals includes a plurality of pilot segments and the pilot segments include a plurality of calibration data, wherein the channel estimation module estimates the channel frequency responses by comparing the calibration data with a plurality of received calibration data stored in the plurality of pilot segments of the received transmission signals.

3. The receiver of claim 2, wherein a number of the pilot segments in each of the transmission signals is equal to a number of the receiver antennas.

4. The receiver of claim 1, wherein the calibration data comprises a long preamble symbol of an IEEE 802.11 a or IEEE 802.11 g wireless LAN specification.

5. The receiver of claim 4, wherein the first matrix is a linear combination matrix multiplied by the long preamble symbol.

6. The receiver of claim 5, wherein the linear combination matrix is an identity M×M matrix $$\begin{bmatrix} 1 & 0 & \cdots & 0 \\ 0 & 1 & \cdots & 0 \\ \vdots & \vdots & \ddots & \vdots \\ 0 & 0 & \cdots & 1 \end{bmatrix},$$

wherein M equals the number of the receiver antennas.

7. The receiver of claim 5, wherein the linear combination matrix is $$\begin{bmatrix} 1 & 1 & \cdots & 1 \\ 1 & \omega & \cdots & \omega^{M-1} \\ \vdots & \vdots & \ddots & \vdots \\ 1 & \omega^{M-1} & \cdots & \omega^{(M-1)^2} \end{bmatrix},$$

wherein $\omega$ is one of the solutions of the linear equation $1+\omega+\ldots+\omega^{M-1}=0$ and M equals the number of the receiver antennas.

8. The receiver of claim 5, wherein the linear combination matrix is $$C_M = \begin{bmatrix} C_{M/2} & C_{M/2} \\ C_{M/2} & -C_{M/2} \end{bmatrix},$$

wherein M is multiple of 2 and equals the number of the receiver antennas, and $C_1=1$.

9. A transmitter for communicating with the receiver of claim 1, the transmitter comprising a plurality of OFDM modules having a plurality of transmitter antennas for substantially simultaneously transmitting the transmission signals via the single frequency band.

10. A method for executing channel compensation at a receiver of an orthogonal frequency division multiplexing (OFDM) communication system wherein a plurality of frequency bands are assigned for signal transmission, the method comprising:
   simultaneously receiving a plurality of transmission signals via a plurality of sub-channels over one of the assigned frequency bands;
   estimating channel frequency responses affecting the received signals, wherein estimating the channel frequency responses further comprises:
      generating a first matrix comprising the received calibration data of the received transmission signals for a sub-channel of the frequency band; and
      multiplying the first matrix by an inverse of a second matrix comprising the calibration data of the transmission signals to generate the estimated channel frequency responses; and
   compensating the received signals with the estimated channel frequency responses.

11. The method of claim 10, wherein each of the transmission signals includes a plurality of pilot segments and the pilot segments include a plurality of calibration data, wherein the channel estimation module estimates the channel frequency responses by comparing the calibration data with a plurality of received calibration data stored in the plurality of pilot segments of the received transmission signals.

12. The method of claim 11, wherein a number of the pilot segments in each of the transmission signals is equal to a number of receiver antennas.

13. The method of claim 10, wherein the calibration data comprises a long preamble symbol of an IEEE 802.11 a or IEEE 802.11 g wireless LAN specification.

14. The method of claim 13, wherein the first matrix is a linear combination matrix multiplied by the long preamble symbol.

15. The method of claim 14, wherein the linear combination matrix is an identity M×M matrix $$\begin{bmatrix} 1 & 0 & \cdots & 0 \\ 0 & 1 & \cdots & 0 \\ \vdots & \vdots & \ddots & \vdots \\ 0 & 0 & \cdots & 1 \end{bmatrix},$$

wherein M equals the number of the receiver antennas.

16. The method of claim 14, wherein the linear combination matrix is $$\begin{bmatrix} 1 & 1 & \cdots & 1 \\ 1 & \omega & \cdots & \omega^{M-1} \\ \vdots & \vdots & \ddots & \vdots \\ 1 & \omega^{M-1} & \cdots & \omega^{(M-1)^2} \end{bmatrix},$$

wherein $\omega$ is one of the solutions of the linear equation $1+\omega+\ldots+\omega^{M-1}=0$ and M equals the number of the receiver antennas.

17. The method of claim 14 wherein the linear combination matrix is $$C_M = \begin{bmatrix} C_{M/2} & C_{M/2} \\ C_{M/2} & -C_{M/2} \end{bmatrix},$$

wherein M is multiple of 2 and equals the number of the receiver antennas, and $C_1=1$.

18. The method of claim 10 further comprising:
   generating a plurality of original transmission signals including the plurality of pilot segments, a number of pilot segments corresponding to a number of transmitting antennas; and
   transmitting the transmission signals via the plurality of sub-channels over the frequency band.

* * * * *